United States Patent
Kang et al.

(10) Patent No.: US 7,522,280 B2
(45) Date of Patent: Apr. 21, 2009

(54) APPARATUS AND METHOD FOR EQUALIZING ILLUMINATION OF LIGHT SOURCES FOR DIGITAL IMAGE TEST MEMBER, AND APPARATUS AND METHOD FOR TESTING COLOR OF DIGITAL IMAGE USING THE SAME

(75) Inventors: Sung Kwan Kang, Jeju-si (KR); Yoon Mo Chowng, Jeju-si (KR); Pil Sang Yoon, Jeju-si (KR)

(73) Assignee: Emerging Memory & Logic Solution, Inc. (KR)

( * ) Notice: Subject to any disclaimer, the term of this patent is extended or adjusted under 35 U.S.C. 154(b) by 235 days.

(21) Appl. No.: 11/697,898

(22) Filed: Apr. 9, 2007

(65) Prior Publication Data
US 2008/0137945 A1    Jun. 12, 2008

(30) Foreign Application Priority Data
Dec. 6, 2006    (KR)    ........................ 10-2006-0123214

(51) Int. Cl.
*G01N 21/55* (2006.01)
(52) U.S. Cl. ...................................... 356/445
(58) Field of Classification Search ................ 356/402, 356/445; 257/257, 499; 382/167
See application file for complete search history.

(56) References Cited

U.S. PATENT DOCUMENTS

| | | | |
|---|---|---|---|
| 3,733,480 A | | 5/1973 | Glenn, Jr. |
| 4,124,292 A | | 11/1978 | Van Wandelen |
| 4,255,045 A | | 3/1981 | Eisenberg |
| 5,060,118 A | * | 10/1991 | Penrod et al. ................ 362/1 |
| 6,062,706 A | | 5/2000 | Owen |
| 2005/0237493 A1 | | 10/2005 | Tajiri |

FOREIGN PATENT DOCUMENTS

KR    1020020008504    1/2002

* cited by examiner

*Primary Examiner*—Kara E Geisel
*Assistant Examiner*—Abdullahi Nur
(74) *Attorney, Agent, or Firm*—Cantor Colburn LLP (57) ABSTRACT

An illumination equalizing device includes a polygonal rotary column disposed in a sealed space, equipped with light sources, and rotatable at specific angular intervals, light sources radiating light onto an image test member attached to a wall of the sealed space for testing a digital image, the light sources mounted on side surfaces of the polygonal rotary column, illuminometers measuring illumination values of light radiated onto the image test member, and a rotary column control unit rotating the polygonal rotary column at set angular intervals so that the illumination values measured by the illuminometers are equalized. A method for equalizing the illumination of light sources for a digital image test member, and an apparatus and method for testing the color of a digital image uses the illumination equalizing device.

20 Claims, 5 Drawing Sheets

APPARATUS AND METHOD FOR EQUALIZING ILLUMINATION OF LIGHT SOURCES FOR DIGITAL IMAGE TEST MEMBER, AND APPARATUS AND METHOD FOR TESTING COLOR OF DIGITAL IMAGE USING THE SAME

This application claims priority to Korean Patent Application No. 10-2006-0123214, filed on Dec. 6, 2006, and all the benefits accruing therefrom under 35 U.S.C. §119, and the contents of which in its entirety are herein incorporated by reference.

BACKGROUND OF THE INVENTION

1. Field of the Invention

The present invention relates generally to testing of a digital image of a digital device and, more particularly, to a device and method for equalizing illumination of light sources for a digital image test member and an apparatus and method for testing the color of a digital image using the same.

2. Description of the Related Art

In every object, the intrinsic color thereof and the color of light radiated onto the object are mixed together. Human vision can detect only the color of an object. For example, human vision perceives the green color of leaves on trees to be almost the same in the morning, in the afternoon, and at dusk. In contrast, a complementary metal-oxide semiconductor ("CMOS") image sensor detects and represents a color in which the color of an object itself and the color of light are mixed together. The difference between the color of an object as detected by a human's unaided eyes and the color of the object as detected by a CMOS image sensor results from the difference in the detection of color.

Due to the difference in the detection of color between a CMOS image sensor and a human's unaided eyes, it is necessary to understand and freely adjust the characteristics of a physical value for the color of light, that is, a color temperature represented in Kelvins, at the time of artificially establishing environmental settings for testing a CMOS image sensor.

If it is impossible to freely adjust color temperature varying with light source at the time of image testing for a CMOS image sensor in a range of implementation of a minute light source (low luminance: <1~30 Lux; normal luminance: 30 Lux~) in steps, light gradually changes from dark brown color to orange, yellow, white, and blue color series as color temperature decreases or increases. Since an image viewed through a CMOS image sensor is changed in the above manner, it is difficult to accurately and precisely determine the characteristics of the image itself as received by the CMOS image sensor.

In the case where, in order to artificially construct the environment of solar light at noon, 3200K is obtained using tungsten lamps, and various illumination (unit: Lux) environments are set up by adjusting the light sources in specific steps, an increase in color temperature causes the overall image to tend toward a blue color series and a decrease in color temperature causes the overall image to tend toward a red color series, even though the illumination is the same.

Due to the above image variation, it may be difficult to perform accurate image tests. When artificial light sources are constructed, such image variation attributable to color temperature variation is a significant problem.

In the case of image testing, the reproduction of white, rather than a specific color, is emphasized, and what is signified by white must be precisely defined. In the case of a CMOS image sensor, white balance is adjusted generally in the early state of color tuning. At this time, the functions of the CMOS image sensor, such as gain or black level, are adjusted such that red, green, blue ("RGB") signal ratios are equalized on the basis of line-up charts, such as a Grey Scale Chart, a White Chart, and a Color Checker, onto which appropriate light is radiated. In other words, the entire image of the CMOS image sensor is produced with reference to an achromatic color such as white or grey. An achromatic color intrinsic to the Grey Scale Chart or White Chart is apparently not changed, but the overall color of an image appears different due to the color of specific light that is radiated onto the achromatic color.

In the image tests of a CMOS image sensor under various light sources (low luminance region: 1~30 Lux; normal luminance region: 30 Lux~), the entire image is determined by light that is radiated onto a line-up chart.

Accordingly, it is difficult to conduct the accurate characteristic tests of an image itself appearing via the CMOS image sensor and to construct an environment for starting color tuning due to color temperature variation. As described above, the most convenient way to define the color of a light source is to use color temperature.

Currently, when light sources are artificially implemented, tungsten lamps having color temperature characteristics most similar to those of solar light are widely used. For example, when an artificial environment is set up using a tungsten lamp having 3200K color temperature characteristics and tests are conducted at fixed illumination without varying illumination in steps, the difference in the color of an image, attributable to variation in color temperature, does not appear.

However, in the image tests of the CMOS image sensor, illumination must be adjusted in steps for specific color temperature regions capable of producing various environments, for example, morning, a clear and blue sky, a cloudy and blue sky, noon, and sunrise and sunset, so that color temperature variation depending on light source, that is, color temperature variation attributable to stepwise illumination adjustment, causes overall image distortion.

Since a camera mounted in a mobile phone, which is a representative application system to which CMOS image sensors are applied, is not used under the same conditions and in the same environment by users, it is necessary to set up various artificial environments and to test the camera using various methods.

Currently, tungsten lamps, which are most widely used as artificial light sources, have an advantage in that they can most closely realize the color temperature of solar light (a color rendering index of 95%). However, in the construction for the testing of CMOS image sensors, color temperature abruptly varies at the time of implementing various environments and adjusting illumination over a precise and wide range, therefore the types of lamps that are capable of implementing various color temperatures are limited.

Although correction may be forcibly made using various filters, e.g. color temperature blue ("CTB"), color temperature orange ("CTO"), neutral density ("ND"), such that color temperature is made uniform, the range of implementation of color temperature of a tungsten lamp and a high amount of heat of a tungsten lamp are limitations to the construction of an artificial light source.

BRIEF SUMMARY OF THE INVENTION

Accordingly, in view of the above problems occurring in the prior art, the present invention provides for CMOS image sensor-dedicated test equipment that realizes color temperature in various environments, provides a precise and wide range of stepwise adjustment of illumination, provides a stable test space, and minimizes the problem of color temperature variation during the adjustment of illumination.

The present invention thus provides a device and method for equalizing the illumination of light sources for a digital image test member, which are capable of equalizing the illumination of artificial light sources while keeping color temperature uniform.

The present invention also provides an apparatus and method for testing the color of a digital image using the device and method for equalizing the illumination of light sources for a digital image test member, which are capable of providing various artificial light sources that can be used in various environments ranging from a low illumination environment to a high illumination environment while keeping color temperature uniform at various color temperatures.

In exemplary embodiments of the present invention, a device for equalizing illumination of light sources for a digital image test member includes at least one polygonal rotary column disposed in a sealed space, equipped with light sources, rotatable at specific angular intervals, and formed in a polygonal column shape, a plurality of light sources configured to radiate light onto the image test member attached to a wall of the sealed space for testing a digital image, and the light sources mounted on side surfaces of the at least one polygonal rotary column, a plurality of illuminometers configured to measure illumination values of light radiated onto the image test member, and a rotary column control unit configured to rotate the at least one polygonal rotary column at set angular intervals so that the illumination values measured by the illuminometers are equalized.

The device may further include a plurality of reflectors mounted on respective surfaces of the at least one polygonal rotary column, to the reflectors condensing the light of the light sources toward the image test member.

The device may further include a diffusion filter disposed between the at least one polygonal rotary column and the image test member, to the diffusion filter condensing the light of the light sources and diffusing condensed light toward the image test member.

In other exemplary embodiments of the present invention, a method of equalizing illumination of light sources for a digital image test member includes disposing an image test member on a surface of a sealed space in order to test a digital image, disposing at least one polygonal rotary column in the sealed space, and arranging light sources on respective surfaces of the at least one polygonal rotary column, condensing light of the light sources using reflectors, diffusing condensed light toward the image test member using a diffusion filter, measuring illumination values of the light sources on the test member, and rotating the at least one polygonal rotary column at set angular intervals to equalize the measured illumination values.

The method may further include, before disposing the at least one polygonal rotary column in the sealed space, equalizing illumination of the light sources for radiating light onto the image using dimming ballasts.

In still other exemplary embodiments of the present invention, an apparatus for testing color of a digital image includes at least one polygonal rotary column disposed in a sealed space, equipped with light sources, rotatable at specific angular intervals, and formed in a polygonal column shape, a plurality of light sources configured to radiate light onto the image test member attached to a wall of the sealed space for testing a digital image, and the light sources mounted on side surfaces of the at least one polygonal rotary column, a neutral density ("ND") filter disposed between the at least one polygonal rotary column and the image test member, and configured to maintain color temperature within a specific range while reducing an amount of light of the light sources, a plurality of illuminometers configured to measure illumination values of light radiated through the ND filter onto the image test member, and a rotary column control unit configured to rotate the at least one polygonal rotary column at set angular intervals so that the illumination values measured by the illuminometers are equalized.

The apparatus may further include dimming ballasts for controlling the illumination of the light sources, eliminating flicker, and maintaining the uniformity of the illumination of the light sources. Furthermore, the apparatus may further include a plurality of reflectors mounted on respective surfaces of the at least one polygonal rotary column, and condensing the light of the light sources, mounted on the respective surfaces of the at least one polygonal rotary column, toward the image test member, and a diffusion filter disposed between the ND filter and the image test member, and condensing the light of the light sources and diffusing condensed light toward the image test member.

In yet other exemplary embodiments of the present invention, a method of testing color of a digital image includes disposing an image test member on a surface of a sealed space in order to test a digital image, disposing at least one polygonal rotary column in the sealed space, and arranging light sources on respective surfaces of the at least one polygonal rotary column, condensing light of the light sources using reflectors, reducing an amount of light of condensed light using an ND filter, diffusing the light, an amount of which has been reduced by the ND filter, toward the image test member using a diffusion filter, measuring illumination values of the light sources on the test member, rotating the at least one polygonal rotary column at set angular intervals to equalize measured illumination values, and testing the color of a digital image of an image device using the test member.

Additionally, according to still other exemplary embodiments of the present invention, a computer-readable recording medium storing a program for executing the above-described inventions in a computer may be provided.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE INVENTION

Embodiments of the present invention are described in detail with reference to the accompanying drawings below. Meanwhile, detailed descriptions of well-known functions and constructions that may make the gist of the present invention unnecessarily obscure are omitted below.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Figure 1:
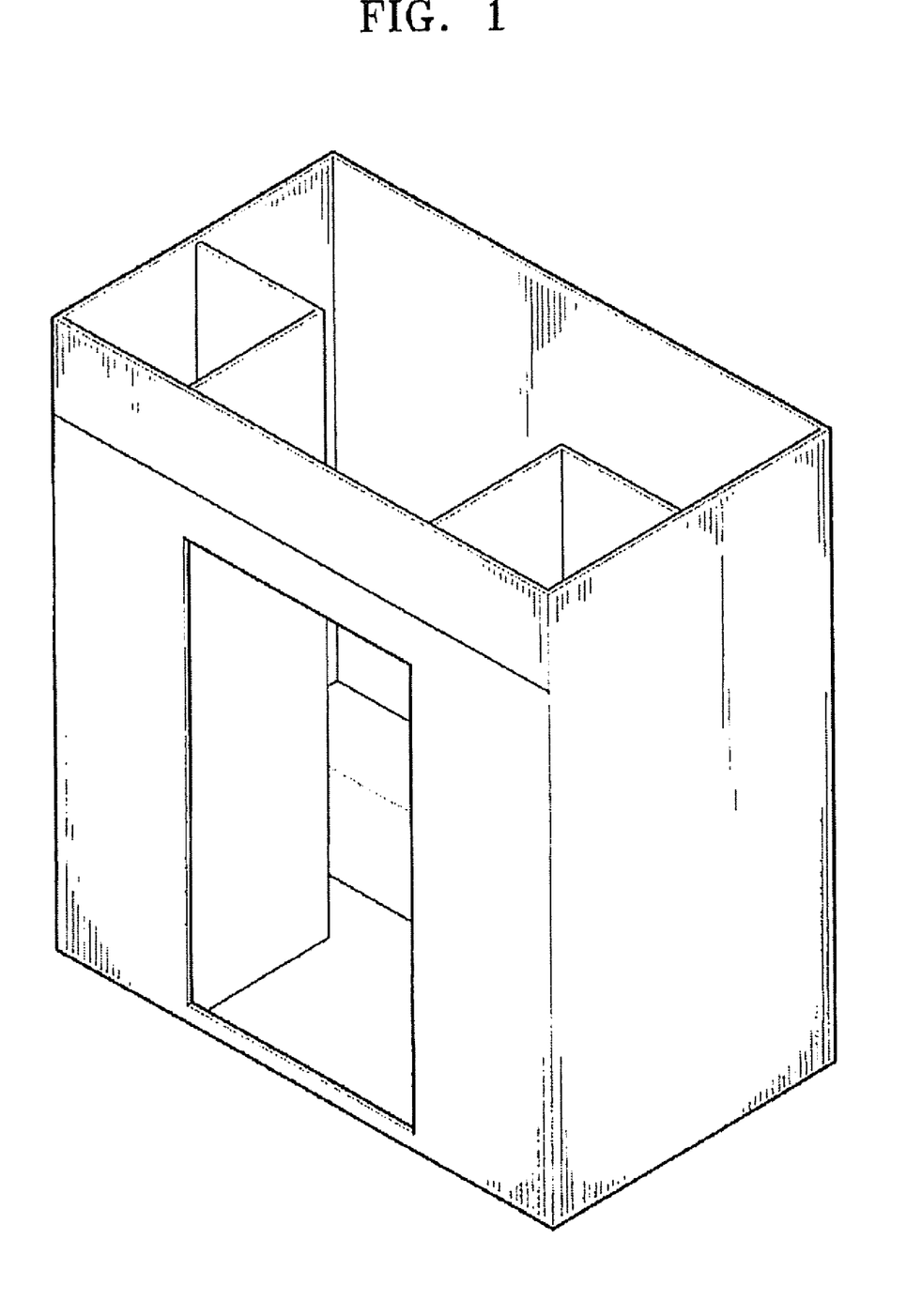
FIG. 1 is a perspective view showing an appearance of an exemplary apparatus for testing the color of a digital image according to the present invention.
Figure 2A:
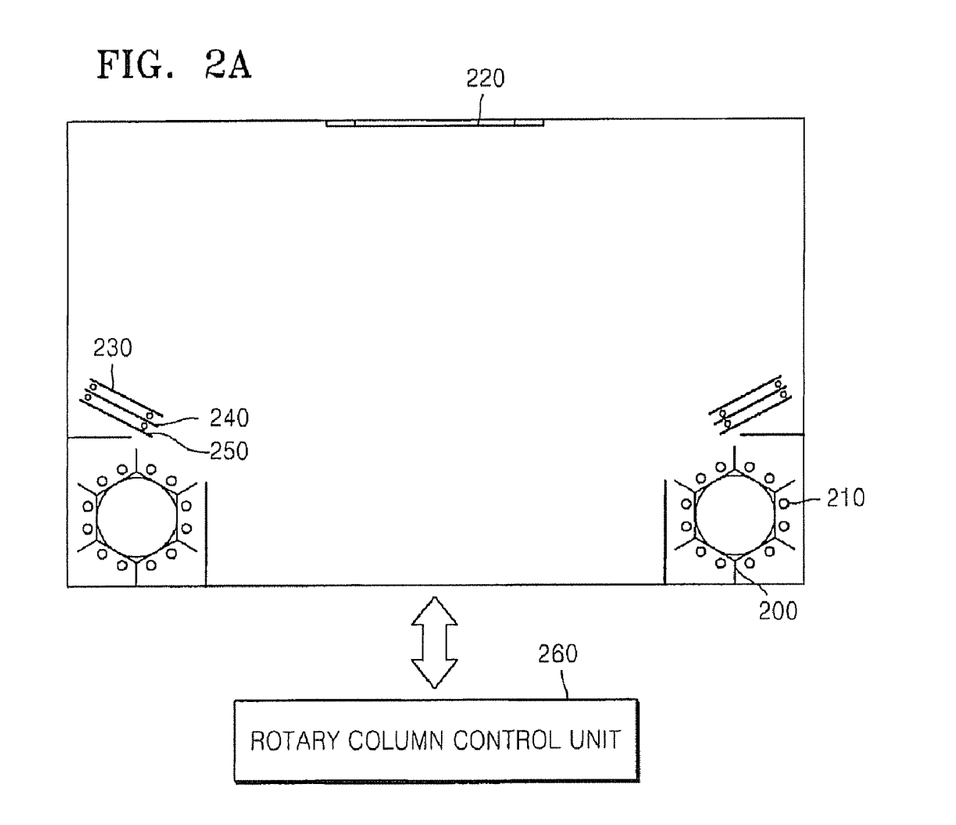
FIG. 2A is a top schematic view showing construction of an exemplary device for equalizing the illumination of light sources for a digital image test member according to the present invention, and the construction of the exemplary apparatus for testing the color of a digital image using the exemplary device.
Figure 2B:
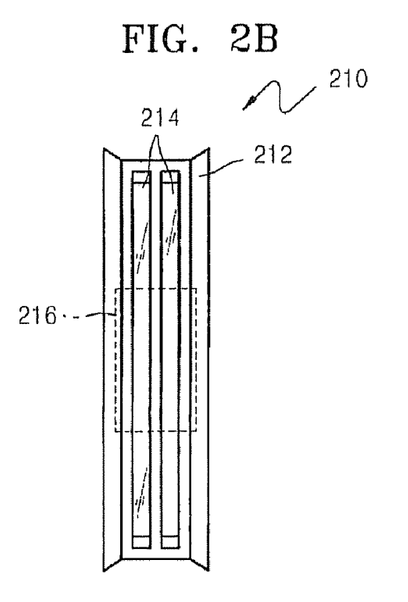
FIG. 2B is a front view showing the exemplary light sources of FIG. 2A in greater detail.
Figure 2C:
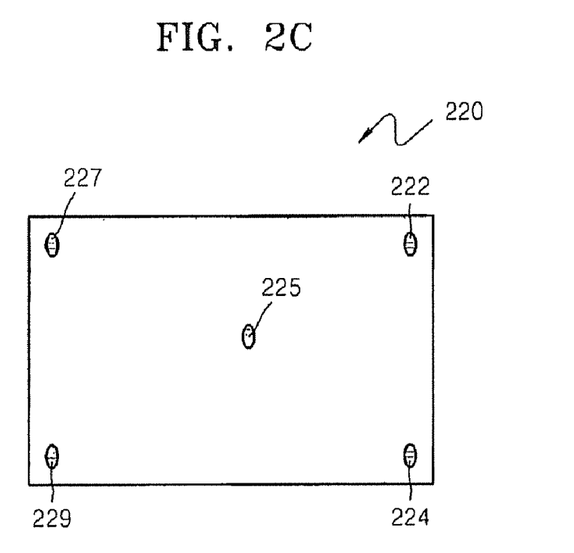
FIG. 2C is a front view showing the exemplary test member of FIG. 2A in greater detail.

A CMOS image sensor is used as a digital device that is employed in an exemplary embodiment of the present invention. FIG. 1 is a perspective view showing an appearance of an exemplary apparatus for testing the color of a digital image according to the present invention. FIG. 2A is a top schematic view showing the construction of an exemplary device for equalizing the illumination of light sources for a digital image test member according to the present invention and the construction of the exemplary apparatus for testing the color of a digital image using the exemplary device. FIG. 2B is a front view showing the exemplary light sources of FIG. 2A in greater detail. FIG. 2C is a front view showing the exemplary test member of FIG. 2A in greater detail, which includes a plurality of illuminometers 222, 224, 225, 227, and 229.

An exemplary device for equalizing illumination light for a digital image test member according to the present invention includes one or more polygonal rotary columns 200, a plurality of light sources 210, the plurality of illuminometers 222, 224, 225, 227, and 229, and a rotary column control unit 260. Preferably, the device further includes a plurality of reflectors 212 and a plurality of diffusion filters 230.

The exemplary apparatus for testing the color of a digital image according to the present invention includes the above-described exemplary device for equalizing the illumination of light sources for a digital image test member and neutral density ("ND") filters 240 and 250, and preferably further includes dimming ballasts 216.

Each of the polygonal rotary columns 200 is disposed in a sealed space, is equipped with light sources, can be rotated at specific angular intervals, and has a polygonal column shape. In an exemplary embodiment of the present invention, the polygonal rotary columns 200 are rotary columns having a hexagonal column shape, however alternate shapes are also within the scope of these embodiments. The polygonal rotary columns 200 are respectively placed on the right and left sides, or other opposing sides, of the sealed space. The sealed space may be a rectangular shaped housing having first and second opposing sides, and third and fourth opposing sides, where the third and fourth sides connect the first and second sides together. By example only, a first rotary column 200 may be disposed adjacent a corner where the second and third sides of the housing meet, and a second rotary column 200 may be disposed adjacent a corner where the second and fourth sides of the housing meet. While a rectangular housing with a pair of polygonal rotary columns 200 has been described, it should be understood that alternate housing shapes and numbers of polygonal rotary columns 200 may also be within the scope of these embodiments. A special paint is applied to the walls of the sealed space to reduce the diffused reflection of light.

The plurality of light sources 210 radiates light onto the image test member 220 attached to a wall of the sealed space for testing a digital image. In the illustrated exemplary embodiment, the image test member 220 is attached to a first side of the housing of the sealed space. The light sources 210 are mounted on the side surfaces of the polygonal rotary column 200, that is, the hexagonal rotary column. In the exemplary embodiment of the present invention, the light sources 210 are preferably fluorescent lamps, and two of the light sources 200 are mounted on each surface of the polygonal rotary column 200. Accordingly, if the polygonal rotary columns 200 are hexagonal rotary columns, 12 fluorescent lamps are mounted on a single rotary column 200. Meanwhile, in the exemplary embodiment of the present invention, light sources having a color temperature different from those of the other light sources are mounted on each surface of the hexagonal rotary column 200. For example, two fluorescent lamps having a color temperature of 3200K, two fluorescent lamps having a color temperature of 4000K, two fluorescent lamps having a color temperature of 5000K, two fluorescent lamps having a color temperature of 5500K, two fluorescent lamps having a color temperature of 6500K, and two fluorescent lamps having a color temperature of 7500K (a total of 12 lamps) may be mounted on respective surfaces (six surfaces) of the hexagonal rotary column 200. In order to implement various light sources 210, the color rendering indices of fluorescent lamps are measured for respective color temperatures, and the fluorescent lamps determined to be most suitable for the implementation of artificial light sources are selected and adopted.

In order to implement various artificial light sources, fluorescent lamps are used, in which case flicker occurs when illumination is controlled using alternating current ("AC") power. A fluorescent lamp has a color rendering index that is significantly lower than that of a tungsten lamp, and it is difficult to implement light that is close to solar light using such a fluorescent lamp. For these reasons, tungsten lamps are used as most artificial light sources. Here, a color rendering index (Ra) numerically indicates the extent to which an artificial light source represents the color of an object in comparison with a reference light source. The proximity of the color rendering index to 100 means that an artificial light source is similar to the reference light source and color is uniformly and naturally represented. The reference light source includes a 3000K light source based on a black body, and a 6000K light source based on daylight.

However, in the present invention, fluorescent lamps are used for the light sources 210. The fluorescent lamps have a considerably wide color temperature range from 3000K to 7500K, unlike tungsten lamps, and have a color temperature variation range superior to that of tungsten lamps. The above-described flicker problem is solved by pulse-width-modulating a direct current ("DC") signal and generating a high frequency signal using DC power, instead of AC power, in the dimming ballast 216 of the equipment of the present invention. For example, a DC constant voltage circuit is provided in the dimming ballast 216, so that DC voltage can always be kept constant without variation in DC voltage attributable to the adjustment of illumination, and a high-frequency generation circuit is provided in the dimming ballast 216, so that switching is performed at a switching frequency equal to or higher than about 45 KHz, thereby suppressing flicker.

The illuminometers 222, 224, 225, 227, and 229 measure the illumination of light radiated onto the image test member 220, and are respectively disposed at the center and four corners of the image test member 220.

The rotary column control unit 260 rotates the polygonal rotary columns 200 at predetermined angular intervals so that illumination values measured by the illuminometers 222, 224, 225, 227, and 229 are equalized. That is, whether illumination measured by the illuminometers 222, 224, 225, 227, and 229 is uniform is checked, the measured illumination is input to the rotary column control unit 260, and the illumination is made uniform by rotating the polygonal rotary columns 200 at predetermined angular intervals.

The reflectors 212 are mounted on respective surfaces of the polygonal rotary columns 200, and function to condense the light of the light sources 210, mounted on the respective surfaces of the polygonal rotary columns 200, toward the image test member 220.

Each of the diffusion filters 230 is disposed between one of the polygonal rotary columns 200 and the image test member 220, and functions to condense the light of the light sources 210 and diffuse the condensed light toward the image test member 220.

The illuminometers 222, 224, 225, 227, and 229 measure illumination at the central and edge portions of the test member 220.

The ND filters 240 and 250 are disposed between one of the polygonal rotary columns 200 and the image test member 220, and function to maintain color temperature within a predetermined range while reducing the amount of light of the light sources 210. The ND filters 240 and 250 include a first ND filter 250 and a second ND filter 240. The first ND filter 250 reduces the amount of light of the light sources 210 to a low illumination while maintaining variation in the color temperature of the light sources 210 within a predetermined range, whereas the second ND filter 240 reduces the amount of light of the light sources 210 to an illumination that is higher than the low illumination and falls in a predetermined range while maintaining variation in the color temperature of the light sources 210 within the predetermined range.

The present invention solves the problem of color temperature variation caused by the variation in light sources. In order to construct various environments in equipment for implementing artificial lights, it is necessary to freely adjust light sources. Meanwhile, when the light sources are adjusted, color temperature varies. However, even if the illumination is freely adjusted in a low luminance region ranging from 1 to 30 Lux and a normal luminance region ranging from 30 to 2000 Lux, the color temperature must be maintained within a tolerance range at the time of testing a CMOS image sensor. The use of DC power for the free adjustment of the illumination of light sources is disadvantageous in that it is difficult to implement light sources having an illumination equal to or lower than 10 Lux using DC power. In order to mitigate and overcome this problem, ND filters are used to forcibly reduce the amount of light of light sources.

The ND filters 240, 250 used in the present invention are dedicated filters, and can adjust color temperature as well. In order to precisely adjust color temperature, three types of filters are used for the construction of artificial light sources. The first ND filter 250 is a dedicated low ND filter, and is a filter for an artificial light source having an illumination ranging from 1 to 10 Lux. The second ND filter 240 is a dedicated high ND filter, and is used for illumination ranging from 10 to 100 Lux. Furthermore, the diffusion filter 230 is a filter that is used for illumination ranging from 100 to 2000 Lux. In the present invention, a function of reducing the amount of light for low luminance is freely performed, and the range of color temperature variation is adjusted to a reference range. Furthermore, reflectors 212 for optimizing the uniformity of illumination of fluorescent lamps are used. Using various conventional ND filters 4X, 8X, 16X, . . . (according to the degree of reduction of light) and coating techniques using glass material, dedicated ND filters capable of minimizing color temperature variation while freely adjusting light sources in a range from 1 to 2000 Lux are employed in the present invention.

The dimming ballasts 216 are electronic dimming ballasts. The dimming ballasts 216 function to control the brightness of the light sources 210, eliminate flicker, and maintain the uniformity of the brightness of the light sources 210. It is preferred that the dimming ballasts 216 be located behind the reflectors 212 shown in FIG. 2B.

Figure 3:
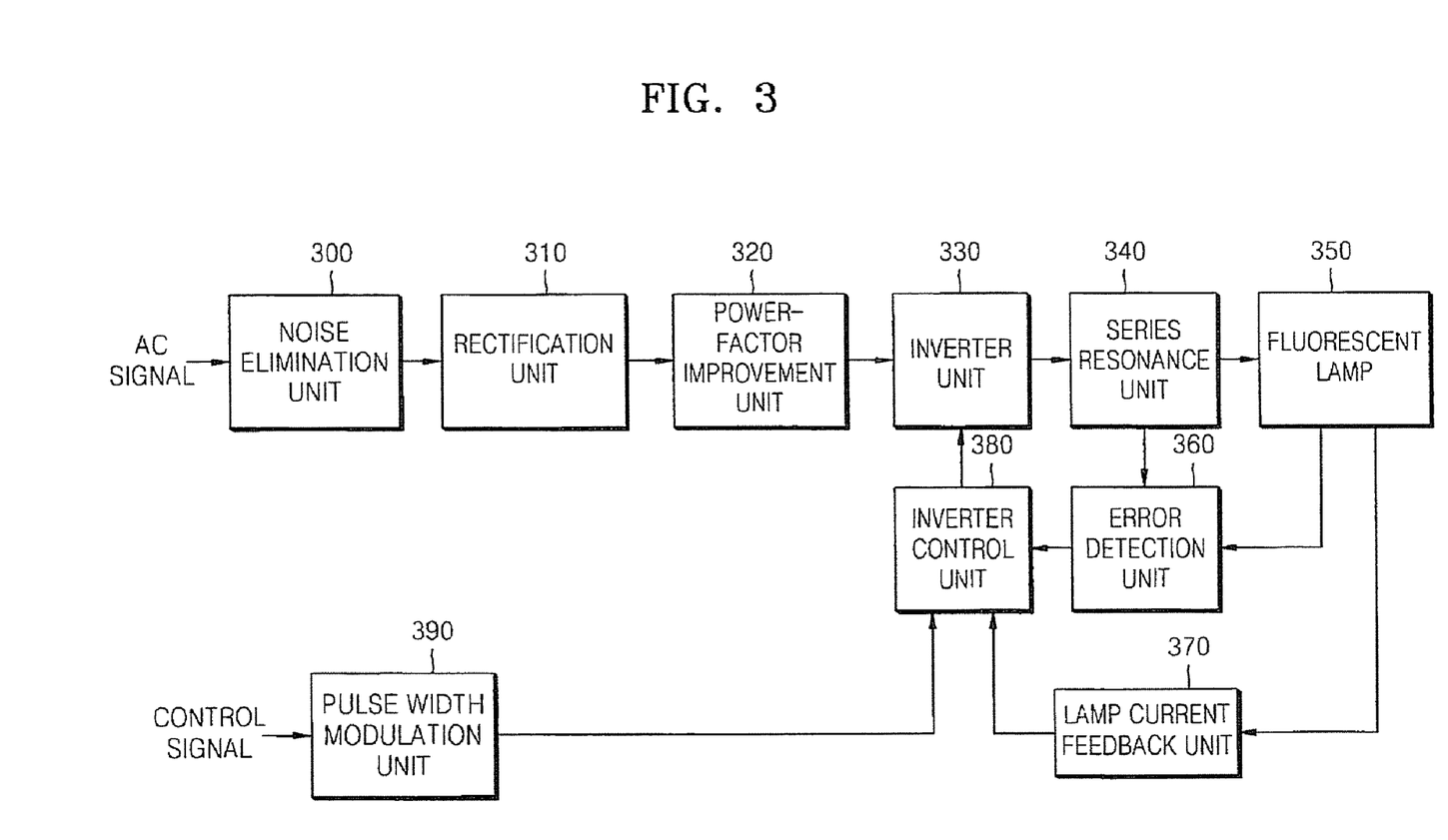
FIG. 3 is a block diagram showing construction of an exemplary dimming ballast for controlling lux.

FIG. 3 is a block diagram showing a construction of an exemplary dimming ballast for controlling lux. First, a process in which a fluorescent lamp is turned on in a dimming ballast for controlling illumination is described below. When high voltage is set up by inducing counter electromotive force using bimetal or the like, a fluorescent lamp is turned on using the high voltage. In general, 220 V and 60 Hz AC signal is input to a noise elimination unit 300, and noise, such as the electromagnetic interference ("EMI") of a circuit board, is eliminated. The AC signal is rectified into a DC signal through a rectification unit 310. The rectified signal is input to a power-factor improvement unit 320 and the power factor of the rectified signal is improved. The DC signal having the improved power factor is input to an inverter unit 330, and is converted into a high-frequency signal through high-frequency switching. Here, a high-frequency signal of about 45 KHz is produced. By doing so, energy can be saved and brightness can be increased. The loss of the AC signal from the high frequency signal is reduced using a series resonance unit 340, and the high frequency signal is input to the fluorescent lamp 350, so that the fluorescent lamp 350 is turned on.

Meanwhile, in an exemplary embodiment of the present invention, pulse width modulation is performed using a pulse width modulation unit 390 and a control signal, preferably a DC voltage in a range from 0 to 10 V. The pulse width modulated signal is input to an inverter control unit 380, and is converted through an inverter unit, such as the inverter unit 330, into a high frequency signal having 75 KHz for a 10V control signal and into a signal having 45 KHz for a 0V control signal. If error occurs in the series resonance unit 340 or fluorescent lamp 350, an error signal is input to the inverter control unit 380 through an error detection unit 360, so that the generation of a high frequency signal is prevented. Furthermore, the current of the fluorescent lamp 350 is fed back through a lamp current feedback unit 370 and is input to the inverter control unit 380, so that control is performed such that lamp current is made constant.

Meanwhile, the control of the uniformity of illumination of the dimming ballast 216 is performed using a method in which a separate illumination measurement device and a color temperature measurement device are provided in the dimming ballast 216 and respective measured values are kept uniform using a low illumination control circuit and a high illumination control circuit, depending on the measured values.

Figure 4:
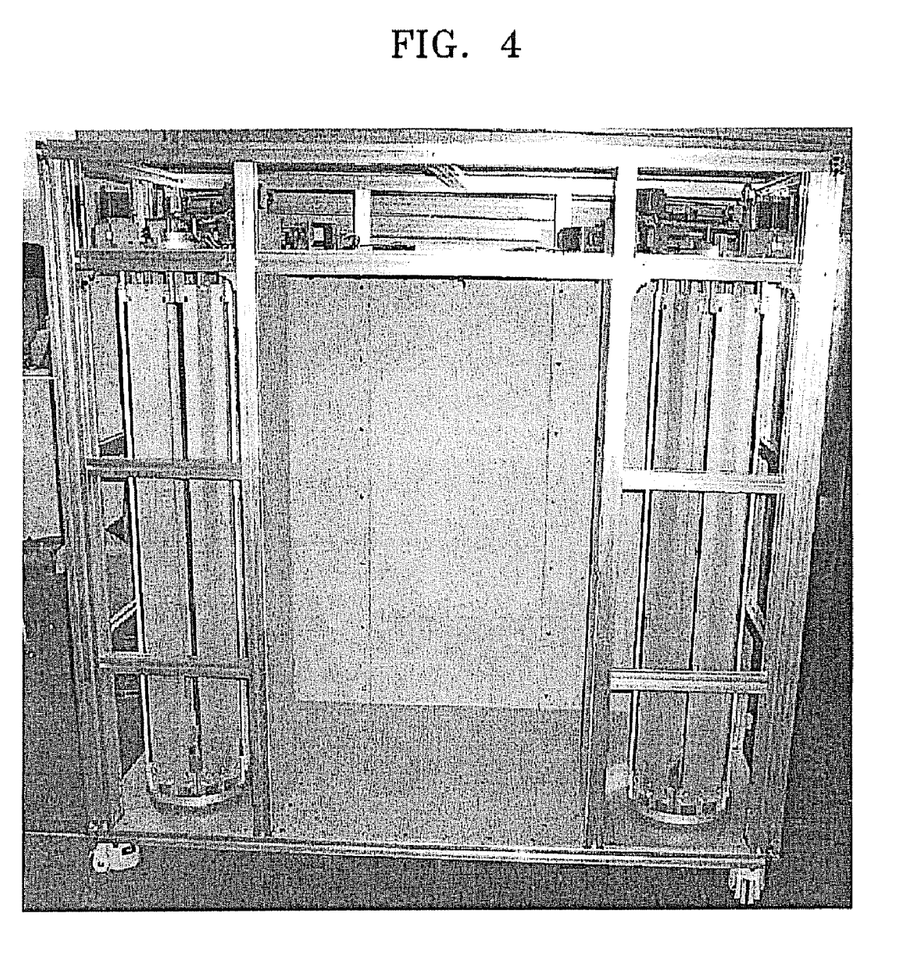
FIG. 4 is a photo showing an exemplary implementation of the exemplary apparatus for testing the color of a digital image according to the present invention.

FIG. 4 is a photo showing an exemplary implementation of the exemplary apparatus for testing the color of a digital image according to the present invention. If light cannot be condensed within a specific test region at the time of implementing artificial light sources, a specific portion of the entire image detected by a CMOS image sensor becomes dark, or an erroneous image is acquired, so that the range of variation in color temperature in the test region increases during the adjustment of illumination. In the implementation of an artificial light source, the characteristic of uniformity of illumination up to a specific test region is very important at the time of testing a CMOS image sensor. In order to solve this problem, a sealed space is formed, a special paint is used to internally minimize the diffused reflection of light, light sources are arranged on right and left sides, light is caused to be radiated onto the test region at an angle of 45 degrees, and reflectors are arranged between the fluorescent lamps, thereby optimizing the uniformity of illumination.

Figure 5:
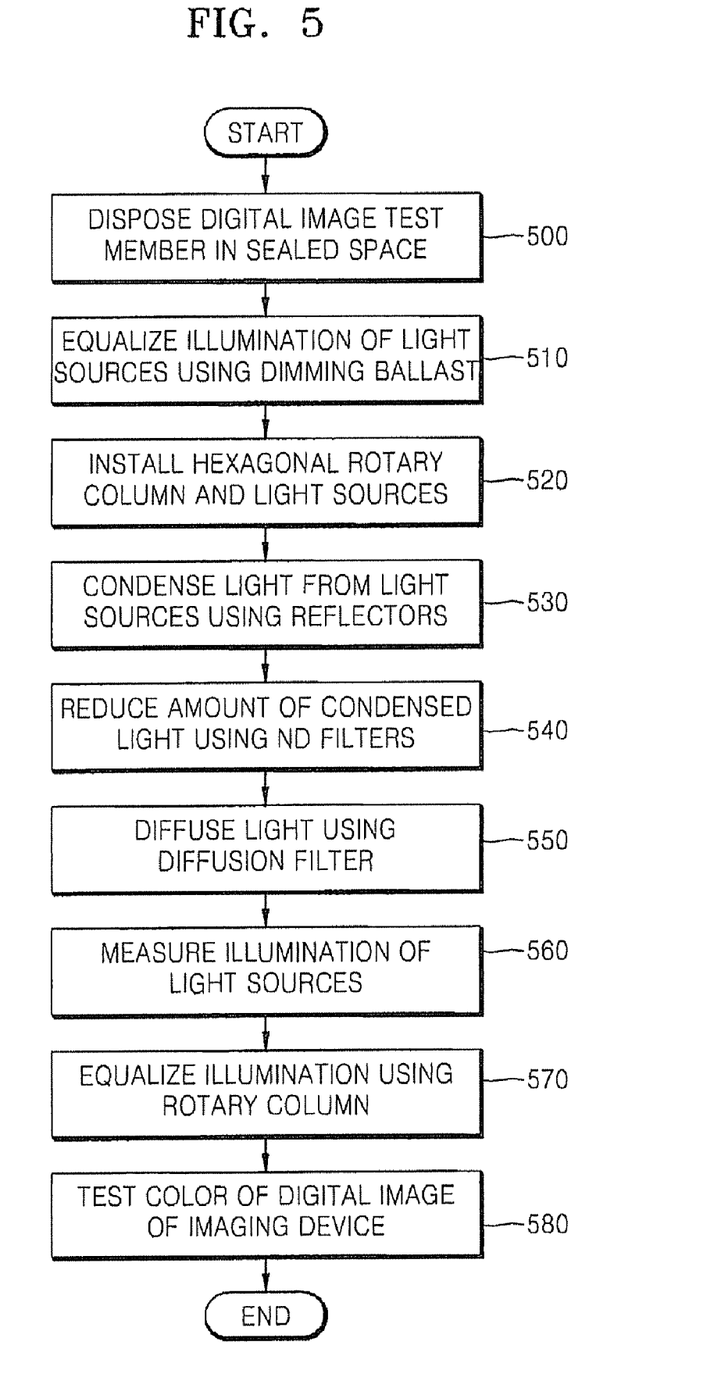
FIG. 5 is a flowchart showing an exemplary method of testing the color of a digital image using an exemplary method of equalizing the illumination of a digital image test member according to the present invention.

Meanwhile, an exemplary method of equalizing the illumination of light sources for a digital image test member and an exemplary method of testing the color of a digital image using the exemplary illumination equalizing method according to the present invention will be described below. FIG. 5 is a flowchart showing the exemplary method of testing the color of a digital image. Since the exemplary method of equalizing the illumination of light sources for a digital image test member according to the present invention is used for the exemplary method of testing the color of a digital image without change, a separate description of the exemplary method of equalizing the illumination is omitted here, but only a description of the exemplary method of testing the color of a digital image according to the present invention is made below.

Referring to FIG. 5, a sealed space for testing a digital image is required, and the image test member 220 is disposed on one surface of the sealed space at step 500, and as previously described with respect to FIG. 2A. A color checker, a shading chart, or the like may be used as the image test member 220. Furthermore, the brightnesses of light sources radiating light onto the image test member 220 are equalized using the dimming ballasts 216 at step 510, and as previously described with respect to FIG. 3. For this purpose, the illuminometers are respectively disposed at the center and corners of the back of the image test member 220, and are used to maintain the uniformity of illumination. The processing for maintaining the uniformity of illumination may be performed using software and a computer interface. Thereafter, the polygonal rotary columns 200 are installed in the sealed space, and light sources 210 are mounted on the surfaces of the polygonal rotary columns 200 at step 520. In the exemplary embodiment of the present invention, hexagonal rotary columns are used as the polygonal rotary columns 200. The light radiated from the mounted light sources 210 is condensed using reflectors, such as reflectors 212, at step 530. The reflectors may be provided for fluorescent lamps in a one-to-one relationship, and function to condense light from the fluorescent lamps. The amount of condensed light is reduced using the ND filters 240 and 250 at step 540. In particular, the ND filters 240, 250 are usefully used at the time of implementing light sources having a low illumination of, for example, 1~12 Lux. The light, the amount of which has been reduced through the ND filters 240 and 250, is diffused to the image test member 220 through the diffusion filters 230 at step 550. Then, the illumination values of the light sources are measured using the illuminometers 222, 224, 225, 227, 229 of the test member 220 at step 560. If the measured illumination values are not uniform, the illumination values are equalized by rotating the polygonal rotary columns 200 at predetermined angular intervals at step 570. After the illumination values have been equalized, the color of the digital image of an imaging device is tested using the image test member 220 at step 580.

The above-described apparatus and method for testing the color of a digital image according to exemplary embodiments of the present invention may be divided into individual evaluation systems, rather than a multiple evaluation system. Accordingly, in terms of a mass-production lineup of CMOS image sensors, it is possible to easily implement particular necessary light sources, and the construction and functions of equipment can be programmed.

Meanwhile, it is possible to implement the present invention in a computer-readable recording medium using computer-readable code. The computer-readable recording medium includes all types of recording devices in which data capable of being read by a computer system is stored. Examples of the computer-readable recording medium include, but are not limited to, ROM, RAM, CD-ROM, magnetic tape, a floppy disk, a hard disk, and an optical data recording device. Furthermore, the present invention may be implemented in the form of carrier waves (for example, transmission via the Internet). Furthermore, computer-readable recording media are distributed to computer systems connected via a network, so that computer-readable codes may be stored and executed in a distributed fashion. Functional programs, codes and code segments for implementing the present invention can be easily contrived by programmers in the technical field to which the present invention pertains.

The exemplary apparatus for testing the color of a digital image according to the present invention can be widely used for the implementation of artificial light sources in the field of the color industry. The apparatus according to exemplary embodiments of the present invention enables the evaluation, verification and modification of digital images, and the detection of color characteristics and the verification and comparative analysis of the interior and exterior colors of a specific product can be performed using only the apparatus of the present invention, without using a darkroom.

Furthermore, although the present invention implements various artificial light sources, the scope of the present invention may be extended to easy interfacing with application systems (H/W and S/W) for the evaluation and verification of digital images using such artificial light sources, to the implementation of various test conditions that could not be realized due to variation in color temperature during the adjustment of light sources in steps, and to the field of the development of test algorithms.

The present invention uses not only the CMOS image sensor but also the fluorescent lamps as artificial light sources, and has functions of optimizing the flicker of the fluorescent lamps, freely adjusting the light sources in steps, and minimizing variation in color temperature. Meanwhile, the ND filters used in the present invention may be applied to tungsten lamps and halogen lamps, and may be widely applied to the evaluation of various digital images, such as plasma display panel ("PDP") or liquid crystal display ("LCD") images.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for equalizing illumination of light sources for a digital image test member, the device comprising:
   at least one polygonal rotary column disposed in a sealed space, equipped with light sources, rotatable at specific angular intervals, and formed in a polygonal column shape;
   a plurality of light sources configured to radiate light onto the image test member attached to a wall of the sealed space for testing a digital image, and the light sources mounted on side surfaces of the at least one polygonal rotary column;
   a plurality of illuminometers configured to measure illumination values of light radiated onto the image test member; and
   a rotary column control unit configured to rotate the at least one polygonal rotary column at set angular intervals so that the illumination values measured by the illuminometers are equalized.

2. The device as set forth in claim 1, wherein walls of the sealed space are coated with a paint reducing diffused reflection of light.

3. The device as set forth in claim 1, wherein the at least one polygonal rotary column has a hexagonal shape.

4. The device as set forth in claim 3, wherein the light sources are fluorescent lamps, and two of the light sources are mounted on each surface of the at least one polygonal rotary column.

5. The device as set forth in claim 1, further comprising a plurality of reflectors mounted on respective surfaces of the at least one polygonal rotary column, the reflectors condensing the light from the light sources toward the image test member.

6. The device as set forth in claim 5, further comprising a diffusion filter disposed between the at least one polygonal rotary column and the image test member, the diffusion filter condensing the light of the light sources and diffusing condensed light toward the image test member.

7. The device as set forth in claim 1, wherein the illuminometers measure illumination at central and edge portions of the test member.

8. The device as set forth in claim 1, wherein the at least one polygonal rotary column comprises two polygonal rotary columns, and the two polygonal rotary columns are respectively placed on opposite sides of the sealed space.

9. A method of equalizing illumination of light sources for a digital image test member, the method comprising:
   (a) disposing an image test member on a surface of a sealed space in order to test a digital image;
   (b) disposing at least one polygonal rotary column in the sealed space, and arranging light sources on respective surfaces of the at least one polygonal rotary column;
   (c) condensing light of the light sources using reflectors;
   (d) diffusing condensed light toward the image test member using a diffusion filter;
   (e) measuring illumination values of the light sources on the test member; and
   (f) rotating the at least one polygonal rotary column at predetermined angular intervals to equalize measured illumination values.

10. The method as set forth in claim 9, further comprising, before step (b), equalizing illumination of the light sources for radiating light onto the image test member using dimming ballasts.

11. An apparatus for testing color of a digital image, the apparatus comprising:
   at least one polygonal rotary column disposed in a sealed space, equipped with light sources, rotatable at specific angular intervals, and formed in a polygonal column shape;

a plurality of light sources configured to radiate light onto an image test member attached to a wall of the sealed space for testing a digital image, and the light sources mounted on side surfaces of the at least one polygonal rotary column;

a neutral density filter disposed between the at least one polygonal rotary column and the image test member, and the neutral density filter configured to maintain color temperature within a specific range while reducing an amount of light of the light sources;

a plurality of illuminometers configured to measure illumination values of light radiated through the neutral density filter onto the image test member; and a rotary column control unit configured to rotate the at least one polygonal rotary column at set angular intervals so that the illumination values measured by the illuminometers are equalized.

12. The apparatus as set forth in claim 11, further comprising dimming ballasts for controlling illumination of the light sources, eliminating flicker, and maintaining uniformity of the illumination of the light sources.

13. The apparatus as set forth in claim 11, further comprising a plurality of reflectors mounted on respective surfaces of the at least one polygonal rotary column, the reflectors condensing the light of the light sources toward the image test member.

14. The apparatus as set forth in claim 11, further comprising a diffusion filter disposed between the neutral density filter and the image test member, the diffusion filter condensing the light of the light sources and diffusing condensed light toward the image test member.

15. The apparatus as set forth in claim 11, wherein the at least one polygonal rotary column comprises two hexagonal rotary columns, and the two hexagonal rotary columns are respectively disposed on opposite sides of the sealed space.

16. The apparatus as set forth in claim 15, wherein the neutral density filter includes:

a first neutral density filter for reducing an amount of light of the light sources to a low illumination while maintaining variation in color temperature of the light sources within a particular range; and a second neutral density filter for reducing an amount of light of the light sources to an illumination that is higher than the low illumination and falls in a set range while maintaining variation in color temperature of the light sources within the set range.

17. The apparatus as set forth in claim 11, wherein the light sources are fluorescent lamps, two of the fluorescent lamps are mounted on each surface of the at least one polygonal rotary column, and the fluorescent lamps have different temperatures for respective surfaces of the at least one polygonal rotary column.

18. The apparatus as set forth in claim 11, wherein the illuminometers measure illumination at central and edge portions of the test member.

19. A method of testing color of a digital image, the method comprising:

(a) disposing an image test member on a surface of a sealed space in order to test a digital image;

(b) disposing at least one polygonal rotary column in the sealed space, and arranging light sources on respective surfaces of the at least one polygonal rotary column;

(c) condensing light of the light sources using reflectors;

(d) reducing an amount of light of condensed light using a neutral density filter;

(e) diffusing the light, an amount of which has been reduced by the neutral density filter, toward the image test member using a diffusion filter;

(f) measuring illumination values of the light sources on the image test member;

(g) rotating the polygonal rotary column at set angular intervals to equalize measured illumination values; and (h) testing color of a digital image of an image device using the image test member.

20. The method as set forth in claim 19, further comprising, before step (b), equalizing illumination of the light sources for radiating light onto the image test member using dimming ballasts.

* * * * *

UNITED STATES PATENT AND TRADEMARK OFFICE
CERTIFICATE OF CORRECTION

| | | |
|---|---|---|
| PATENT NO. | : 7,522,280 B2 | Page 1 of 1 |
| APPLICATION NO. | : 11/697898 | |
| DATED | : April 21, 2009 | |
| INVENTOR(S) | : Kang et al. | |

It is certified that error appears in the above-identified patent and that said Letters Patent is hereby corrected as shown below:

Title Page, Item (73), Assignee, delete "Emerging Memory & Logic Solution, Inc. (KR)" and insert therefor --Emerging Memory & Logic Solution, Inc. (KR) and Isolution Co., Ltd. (KR)--.

Signed and Sealed this

Ninth Day of February, 2010

David J. Kappos
*Director of the United States Patent and Trademark Office*